No. 719,775. PATENTED FEB. 3, 1903.
L. F. FERRELL.
COMB HOLDER AND CLEANER.
APPLICATION FILED OCT. 13, 1902.
NO MODEL.
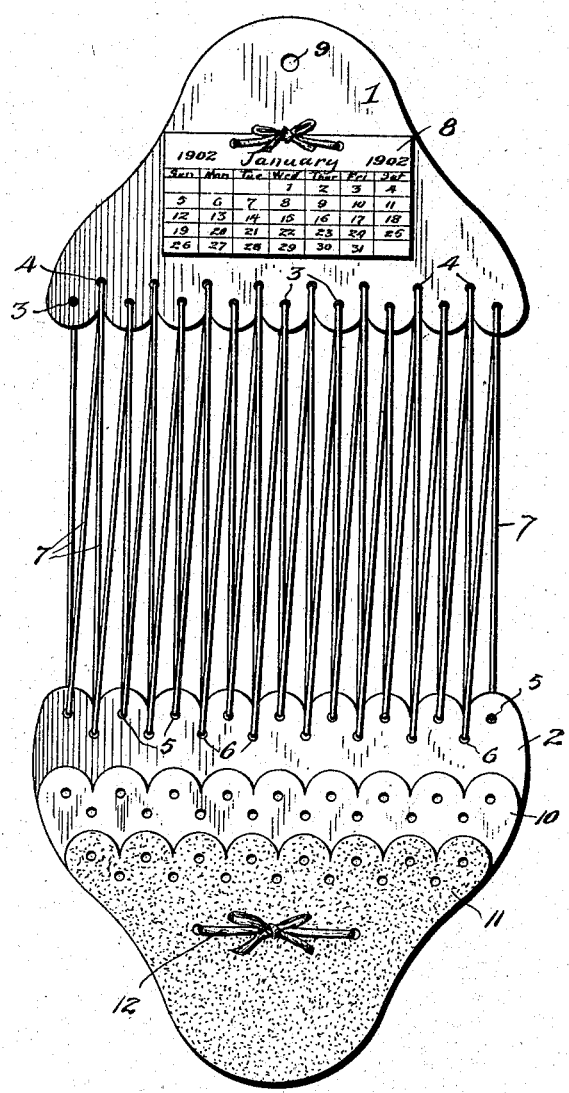
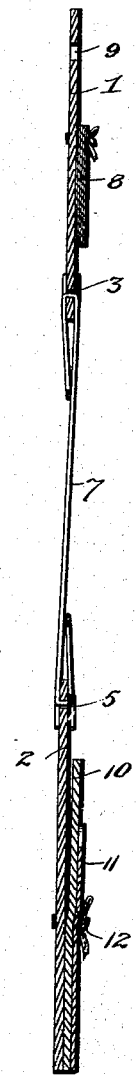
Witnesses
Inventor
L. F. Ferrell
By H. B. Willson & Co.
Attorneys

UNITED STATES PATENT OFFICE.

LENA F. FERRELL, OF LAMONTE, MISSOURI.

COMB HOLDER AND CLEANER.

SPECIFICATION forming part of Letters Patent No. 719,775, dated February 3, 1903.

Application filed October 13, 1902. Serial No. 127,141. (No model.)

*To all whom it may concern:*

Be it known that I, LENA F. FERRELL, a citizen of the United States, residing at Lamonte, in the county of Pettis and State of Missouri, have invented certain new and useful Improvements in Comb Holders and Cleaners; and I do declare the following to be a full, clear, and exact description of the invention, such as will enable others skilled in the art to which it appertains to make and use the same.

My invention relates to a combination device comprising a comb-holder, a comb-cleaner, a match-striker, and a calendar.

The object of the invention is to provide a useful and attractive device of this character which is simple in construction, and hence inexpensive of production.

With this and other objects in view the invention consists in certain novel features of construction, combination, and arrangement of parts, which will be hereinafter more fully described, and particularly pointed out in the appended claims.

Referring to the drawings, Figure 1 is a front elevation of my combination device. Fig. 2 is a central vertical section through the same.

Referring now more particularly to the drawings, the numeral 1 denotes the upper member or plate, which is preferably substantially triangular in form, the base of which may be scalloped or ornamented in any desired manner and provided with a double row of perforations 3 and 4. The lower member or plate 2 is similar in shape to the upper member and similarly ornamented along its upper edge, which is the base inverted, and has a double row of perforations 5 and 6. The comb-cleaning strands 7, uniting the two members, consist of a single piece of cord, wire, or any other material passed or laced back and forth through the perforations 3 4 and 5 6, as shown in Fig. 1 of the drawings.

The upper plate or member 1 may have a calendar 8 secured in any desired manner upon its front face and is provided at its top with a perforation 9, by means of which it may be suspended.

The lower plate or member 2 has upon its front face a comb-holding plate or member 10, which is similar in shape but smaller in size than the member 2 and which may be ornamented in any desired manner. A pocket is thus formed between the two plates in which a comb may be held. The front surface of this plate may be roughened, or a separate plate or member 11, which is preferably of sandpaper, may be provided upon which friction-matches may be struck to ignite the same. The three plates or members 2, 10, and 11 may be held together by any desired means; but I prefer to unite them by the ribbon 12, which is passed through registering apertures in said members and tied in a bow upon the front.

Any desired ornamentation or advertising matter may be placed upon the front or back of this device, and the same may be made from any desired material.

The use of the device as a comb-cleaner will be readily understood. The strands 7 enter between the teeth of the comb, and as the same is moved back and forth the dirt will be quickly removed. A comb or any similar object may be inserted in the pocket between the plates or members 2 and 10 and will be held there by the friction of the plates.

From the foregoing description, taken in connection with the accompanying drawings, it is thought that the construction, operation, and advantages of my improved comb holder and cleaner will be readily apparent without requiring a more extended explanation.

Various changes in the form, proportion, and the minor details of construction may be resorted to without departing from the principle or sacrificing any of the advantages of this invention.

Having thus fully described my invention, what I claim, and desire to secure by Letters Patent, is—

1. A device of the character described, comprising an upper member, a lower member provided with a comb-holding pocket, and cleaning-strands uniting said members, substantially as described.

2. A device of the character described, comprising an upper member formed with perforations, a lower member formed with perforations, cleaning-strands formed of a single piece of material laced between said members and passing through said perforations, a comb-holding plate secured to one of said members and forming a pocket therewith, substantially as described.

In testimony whereof I have hereunto set my hand in presence of two subscribing witnesses.

LENA F. FERRELL.

Witnesses:
 ELLA GUTHRIE,
 MARGARET PRICE.